UNITED STATES PATENT OFFICE.

GEORGE W. FITTS, OF NEW YORK, N. Y., ASSIGNOR TO NOBLE M. EBERHART AND ANDREW L. THOMPSON, OF CHICAGO, ILLINOIS.

DISINFECTING CAKE OR TABLET.

SPECIFICATION forming part of Letters Patent No. 417,386, dated December 17, 1889.

Application filed April 5, 1888. Serial No. 269,719. (No specimens.)

*To all whom it may concern:*

Be it known that I, GEORGE W. FITTS, a citizen of the United States, residing in the city of New York, State and county of New York, have invented a new and useful Composition of Matter to be Used for Absorbing and Holding Solutions or Liquids and Forming a Dissolvable Solid, of which the following is a specification.

My composition consists of the following ingredients combined substantially in the proportions stated, viz: plaster-of-paris, three (3) pounds; flowers of sulphur, one (1) pound.

In preparing this composition the best quality of plaster-of-paris and flowers of sulphur should be stirred together dry until thoroughly mixed. Shake this mixture through a fine sifter, and place two (2) pounds of the sifted mixture in a glass pitcher, (holding one gallon or more.) Then pour into the pitcher one quart of the solution or liquid desired to be absorbed and stir the solution and mixture rapidly together until thoroughly mixed. Then pour out into glass molds of such form as may be desired, which will soon become solid.

Care must be observed by the operator not to stir the mixture too long after the solution is added or it will become too solid to pour out.

I do not confine myself to the exact proportions herein specified, for if it is desirable to have a very hard solid, one that will dissolve or wash away very slowly, the proportions may be changed by increasing the amount of plaster-of-paris. If a soft solid is desired, one that will dissolve or wash away quickly, increase the amount of flowers of sulphur in each case, the other ingredients remaining the same as specified.

By this composition I am enabled to transfer solutions or liquids into a solid that will permit of being gradually dissolved or dissipated, and which is useful for toilet, medicinal, disinfectant, mechanical, and many other purposes.

It is well known that plaster-of-paris has long been used for the purpose of absorbing and holding solutions, and it is equally certain that it will not readily disintegrate, nor will it dispense them again when so absorbed; hence the improvement of my invention, which both absorbs and hold solutions and their ingredients and will also dispense and dissipate them again.

My claim is to secure by Letters Patent of the United States—

A composition of substances, forming an absorbing and disintegrating solid, composed of plaster-of-paris and flowers of sulphur, substantially in the proportions and for the purposes specified.

GEORGE W. FITTS.

Witnesses:
ELISE H. STANTON,
R. C. BROOKS.